United States Patent [19]

Weston et al.

[11] Patent Number: 5,169,498
[45] Date of Patent: Dec. 8, 1992

[54] ATMOSPHERIC PRE-STEAMING CHIP BIN VACUUM AND PRESSURE RELIEF DEVICE

[75] Inventors: John D. Weston; Keith P. Vogel; Victor L. Bilodeau; Mark D. Barrett; Ronald G. Bain, all of Glens Falls, N.Y.

[73] Assignee: Kamyr, Inc., Glens Falls, N.Y.

[21] Appl. No.: 753,995

[22] Filed: Sep. 3, 1991

[51] Int. Cl.⁵ .............................. D21C 7/06
[52] U.S. Cl. ........................ 162/246; 34/15
[58] Field of Search ............ 162/52, 246, 250; 34/15, 51; 137/527.8; 138/45, 46

[56] References Cited

U.S. PATENT DOCUMENTS

| | | | |
|---|---|---|---|
| 2,624,513 | 1/1953 | Field | 137/527.8 |
| 3,739,484 | 6/1973 | Wilkening et al. | 34/51 |
| 4,124,440 | 11/1978 | Sherman | 162/246 |

FOREIGN PATENT DOCUMENTS 1154622  4/1983  Canada .
1146788  5/1983  Canada .

Primary Examiner—W. Gary Jones
Assistant Examiner—Brenda Lamb
Attorney, Agent, or Firm—Nixon & Vanderhye

[57] ABSTRACT

The proper pressure conditions are maintained within an atmospheric pre-steaming chips bin used in the production of paper pulp. Extending upwardly from the top of the chips bin is a vertical section of conduit, an elbow section, and a horizontal section. A door guide with a door opening in it is disposed in the horizontal section and precludes passage of gas through the horizontal section except through the door opening. A pivot pin mounts a door at its top so that it normally assumes a vertical orientation closing off the opening, and it is adjustably biased into that orientation by a counterweight mechanism. The counterweight includes weight discs which mount on a vertical section of rod having external screw threads, and a horizontal section of rod is connected by a flange to a flange of the pivot pin. The door remains closed unless the pressure differential between the chips bin and the surrounding environment is greater than about 2 psig, in which case gas may flow from the environment to the chips bin, or vice versa, to bring the pressure differential within the desired range.

8 Claims, 3 Drawing Sheets

ATMOSPHERIC PRE-STEAMING CHIP BIN VACUUM AND PRESSURE RELIEF DEVICE

RELATED APPLICATIONS

Background and Summary of the Invention

A chips bin is a common piece of equipment in the pulp and paper industry used for atmospheric pre-steaming of wood chips and like comminuted cellulosic fibrous material that ultimately is steamed, impregnated with treatment liquid, and digested to produce paper pulp. In a chips bin, it is normal to provide a pressure differential between the bin and the surrounding environment; however, if the pressure differential gets too great, it is highly desirable to provide a mechanism to allow the differential pressure to move toward equalization.

In the 1970's, an attempt to provide excessive vacuum or pressure relief for chip bins included the utilization of a pipe about 6 inches in diameter with a single weir. However, since the CFM requirements became larger, with a ΔP equal to about 10 inches WG, such a system became unusable. In the late 1980's, a liquid seal concentric ring weir was tried. However, such a device was less effective than desired since it did not take into account water freezing in cold weather, and it was large and cumbersome.

According to the present invention, a method and apparatus are provided for maintaining proper pressure conditions within an atmospheric pre-steaming chips bin during the treatment of comminuted cellulosic fibrous material to make paper pulp, the mechanism according to the invention—and utilized in the practice of the method of the invention—allowing a desired predetermined pressure differential to be maintained, but allowing the flow of gas either into the chips bin from the surrounding environment, or from the chips bin to the surrounding environment, should the pressure differential become greater than the predetermined desired amount.

According to one aspect of the present invention, a method of maintaining proper pressure conditions in a chips bin, utilizing a vent from a top portion of the bin including a horizontal pipe section, is provided. The method comprises the following steps: (a) Feeding comminuted cellulosic fibrous material and steam into the chips bin to effect steaming of the material. (b) Discharging steamed material from a bottom portion of the chips bin. (c) Precluding passage of gases through the horizontal pipe section if the pressure differential between the interior of the chips bin and the surrounding environment is less than a predetermined level; and (d) allowing passage of gases into, or out of, the chips bin from or to the surrounding environment through the horizontal pipe if the pressure differential is greater than the predetermined level. Steps (c) and (d) are preferably practiced by: (i) providing a door mounting guide, with a door guide opening, in the horizontal pipe; (ii) mounting a door, pivotal about a horizontal axis located above the door guide opening, in operative association with the door guide to normally assume a vertical orientation, blocking the flow of gases through the door guide opening; and (iii) adjustably biasing the door to its vertical orientation so that it does not pivot about the horizontal axis unless the differential pressure is greater than said predetermined level. A counterweight preferably provides the adjustable biasing force, so that substep (iii) is practiced by adding or removing weight to or from the counterweight. Preferably, the pressure differential predetermined level is approximately 2 psig.

According to another aspect of the present invention, a chips bin—having a vent for allowing gases to enter or leave the bin if the differential pressure between the interior of the bin and the surrounding environment is greater than a predetermined level—is provided. The chips bin comprises: A generally vertically oriented vessel having a top, and a bottom, wi&h a first opening in the top for receipt of comminuted cellulosic fibrous material, and a second, vent, opening in the top. A material discharge from the bottom of the chips bin. A conduit extending from the second opening, and including a vertical section, an elbow section, and a horizontal section. Means defining a door guide in the horizontal section, having a door opening therein, the door guide precluding passage of gas therepast in the horizontal section except through the door opening. Means defining a pivot axis above the door opening. A pivot pin; and a door having opposite faces, and mounted by the pivot pin in operative association with the means defining a pivot axis, so that the door is normally generally vertically oriented, closing the door opening in the door guide, but is pivotal in either direction about the axis in response to the pressure of gases on either face thereof which is greater than a predetermined amount than the pressure of gases on the opposite face thereof. A counterweight means applies an adjustable bias to the door for maintaining the door in its vertical orientation, closing off the door opening. Gussets may be provided extending between the top of the chips bin and the elbow and horizontal section to positively support them on the top of the chips bin. The horizontal section is formed by a first pipe having a vertical flange on one end and connected to the elbow on the opposite end, and a second pipe having a vertical flange on one end. Removable fasteners pass through alignable openings in the pipe vertical flanges to hold them together, outside the diameter of the door guide.

The invention also contemplates a vent assembly in general. The vent assembly of the invention comprises: A horizontal section of pipe. Means defining a door guide in the horizontal section, having a door opening therein, the door guide precluding passage of gas therepast in the horizontal section except through the door opening. Means defining a pivot axis above the door opening. A pivot pin. A door having opposite faces, and mounted by the pivot pin in operative association with the means defining a pivot axis, so that the door is normally generally vertically oriented, closing the door opening in the door guide, but is pivotal in either direction about the axis in response to the pressure of gases on either face thereof which is greater than a predetermined amount than the pressure of gases on the opposite face thereof; and counterweight means for applying an adjustable bias to the door for maintaining the door in its vertical orientation. Preferably, the pivot pin has a first end extending outwardly from one side of the horizontal section, and has a flange perpendicular to the axis defined by the pivot pin. Counterweight means includes a rod with a vertical portion and a horizontal portion, the horizontal portion having a flange perpendicular to it and parallel to the vertical portion. Openings are provided in the flanges for cooperation with each other so that fasteners can pass through them to allow connection of the rod to the pivot pin. The openings in the rod flange are elongated, arcuate openings so that the angular position of the rod flange with respect to the pivot pin flange may be adjusted. External screw threads on the vertical section of the rod allow a plurality of weight discs which pass over the rod to be held in place on the rod with nuts, preferably at opposite ends of the rod vertical section.

It is the primary object of the present invention to provide for the effective maintenance of a pressure differential within a chips bin, yet allowing the chips bin to be vented under both vacuum and pressure conditions that are greater than desired. This and other objects will become clear from an inspection of the detailed description and appended claims.

DETAILED DESCRIPTION OF THE DRAWINGS

Figure 1:
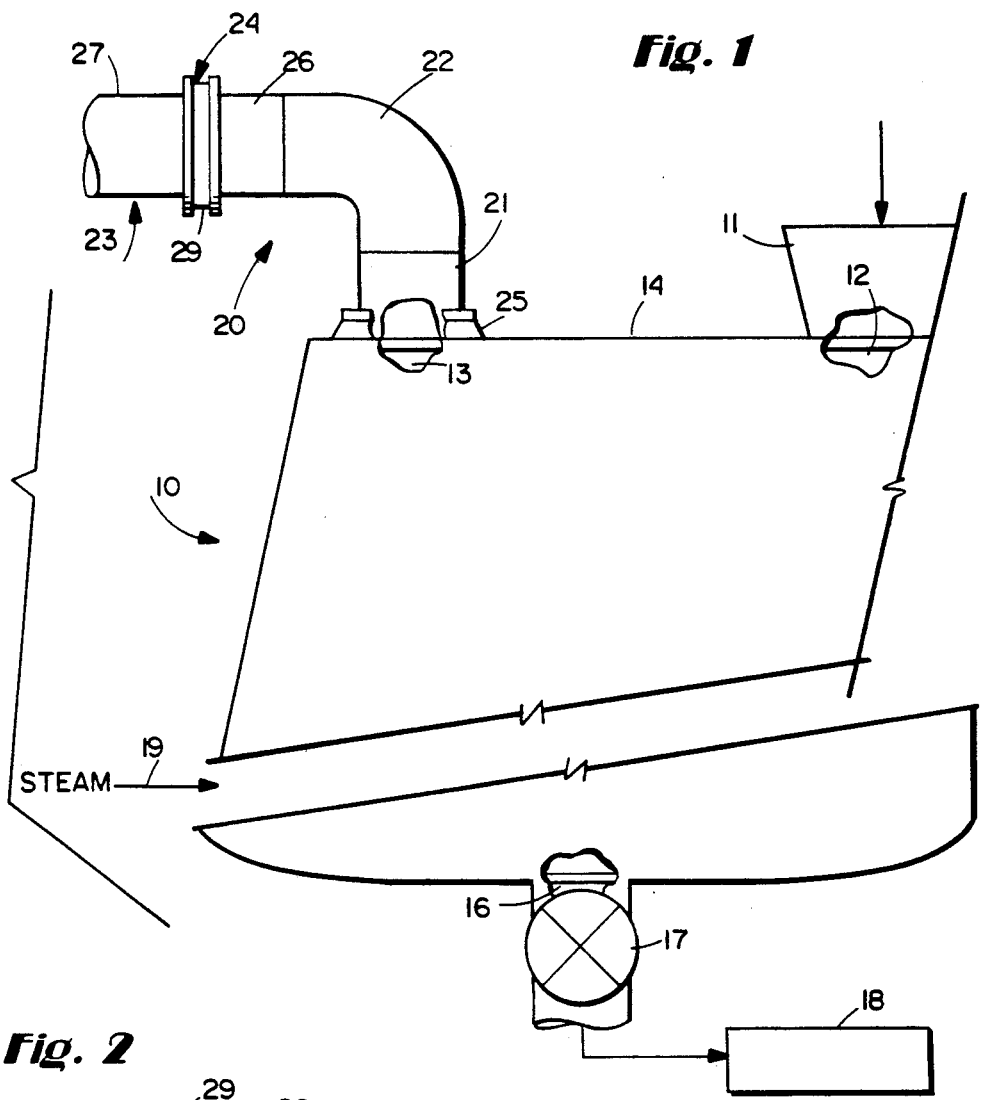
FIG. 1 is a side schematic view, with most of the bin cut away, of a conventional chips bin utilizing a vacuum/pressure relief according to the invention.
Figure 5:
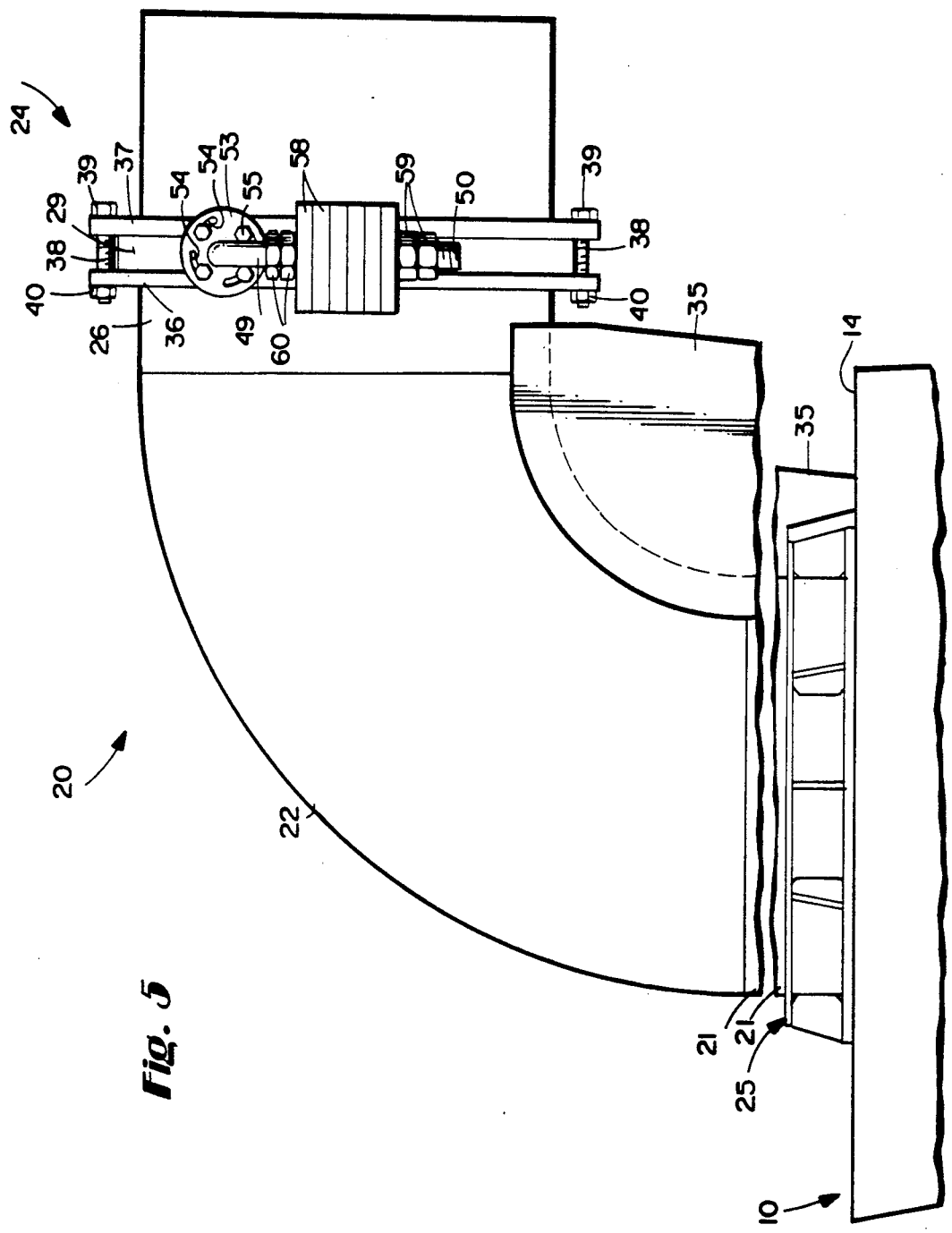
FIG. 5 is a detail side view of the relief mechanism illustrated in FIGS. 2 through 4 shown from the side opposite to that shown in FIG. 1.

An otherwise conventional chips bin, utilizing the vacuum and pressure relief mechanism and procedure according to the invention, is shown generally by reference numeral 10 in FIGS. 1 and 5. The chips bin 10 has an inlet 11 communicating with a first opening 12, and a second opening 13 in the top 14 thereof. The inlet 11 is for comminuted cellulosic fibrous material, such as wood chips, which will be steamed in the chips bin, and the opening 13 is for vacuum/pressure relief according to the invention. The chips bin 10, as is conventional, includes a bottom 15 with a discharge 16 therein, and preferably the discharge 16 communicates through a conventional low pressure feeder 17 with a horizontal steaming vessel 18 or the like. The vessel 18 is then connected to an impregnation vessel, digester, or other equipment conventional in the industry for the production of paper pulp. Steam may be added to the chips bin in any conventional manner—shown only schematically by reference numeral 19 in FIG. 1—for pre-steaming the chips in a bin, such as shown in U.S. Pat. No. 4,124,440, and Canadian Patent 1,146,788. The disclosure of said patents U.S. Pat. No. 4,124,440, and Canadian 1,146,788 are hereby incorporated by reference herein.

Figure 6:
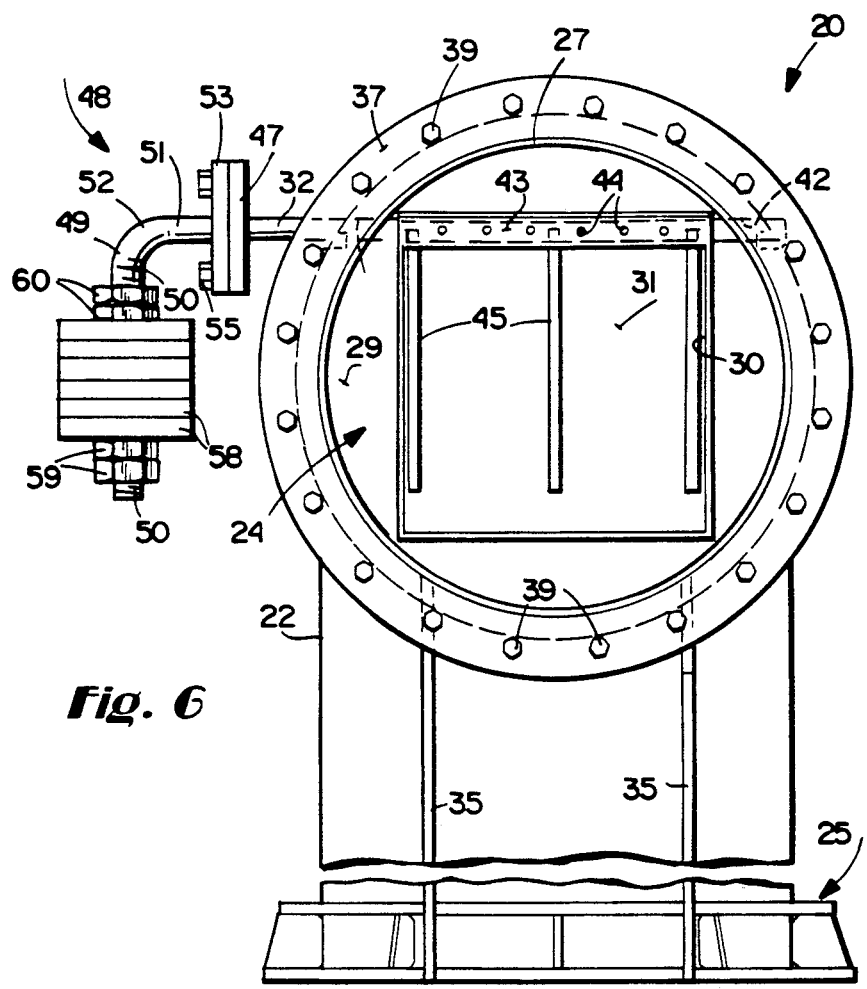
FIG. 6 is a front end view of the mechanism of FIG. 5.

According to the present invention, vacuum/pressure relief is provided by a mechanism illustrated generally by reference numeral 20 in FIGS. 1, 5, and 6. The mechanism 20 includes a vertical section of conduit (pipe) 21 which communicates with the second opening 13 in the top 14 of the chips bin 10 at one end thereof, and section 21 in turn communicates with an elbow (e.g. right angle elbow) pipe section 22. The pipe section 22 communicates with a horizontal section of pipe 23, and associated therewith is a movable closure mechanism 24 according to the invention. The vertical pipe section 21 is connected to the top 14 of the chips bin 10 with a base ring 25 which is welded to both the top 14 and the vertical pipe section 21. The horizontal section 23 is preferably provided by a first pipe section 26 connected to the elbow 22, and a second pipe section 27 extending away from the mechanism 24, with means defining a door guide 29 between the portions 26, 27.

The door guide defining means 29 comprises a piece of metal or plastic which defines a door opening 30 (see FIGS. 2 and 6) therein. Mounted within the opening 30 is a door 31 which is mounted at the top thereof by a horizontally extending pivot pin shaft 32 which allows pivotal movement between the door 31 and the door guide 29.

Figure 2:
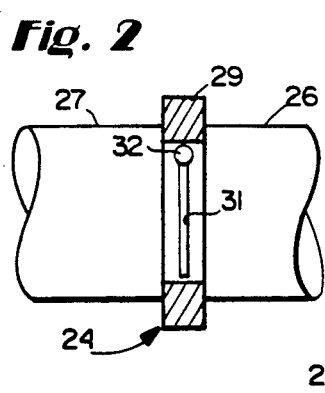
FIGS. 2 through 4 are side cross-sectional schematic views of the pressure relief section of the chips bin of FIG. 1 showing a normal, excessive vacuum, and excessive pressure conditions within the bin, respectively.
Figure 3:
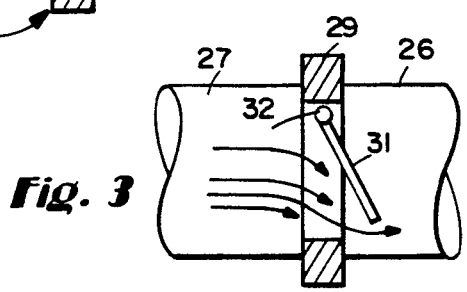
Figure 4:
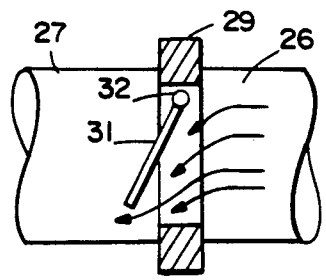

FIGS. 2 through 4 illustrate, schematically, the vacuum/pressure relief function of the mechanism 24 according to the invention. During normal operation when the pressure within the chips bin 10 is atmospheric, or within a predetermined pressure differential (e.g., about 2 psig) of atmospheric, the door 31 completely blocks off the opening 30 so that no substantial gas passage through the opening 30 takes place. However, should there become an excessive vacuum condition within the bin 10, then the door 31 moves to the position illustrated in FIG. 3, allowing air from the surrounding environment to pass into the opening 30 into the bin 10 (through pipe section 26), thereby lowering the differential pressure until the door 31 returns to the vertical/opening-blocking, orientation illustrated in FIG. 2. Should there be an excessive build up of pressure within the chips bin 10, so that the pressure therein is greater than the predetermined pressure differential, then gases from within the bin 10 will move the door 31 about the pivot pin 32 in the direction illustrated in FIG. 4, and vent to the atmosphere through the tube section 27.

The details of the mechanism 24 and associated components is provided in FIGS. 5 and 6. Note—as illustrated in FIG. 6—preferably the pipe sections 27, 26 are circular in cross section (as are 21 and 22); for example, the sections 27, 26 may have an internal diameter of about 23.6 inches. A vertical flange 36 is provided at one end of the pipe section 26, and a vertical flange 37, is provided at one end of the pipe section 27. The flanges 36, 37 preferably have an outside diameter of about 30 inches. The door guide 29 is a generally circular piece of material, preferably ultra-high molecular weight plastic, such as that sold under the trademark CADCO ® by Cadillac Plastics of Albany, N.Y. The door guide 29 is preferably circular in plan view, having a diameter of about 27½ inches. The door opening 30 disposed therein is preferably approximately square, for example, having a horizontal dimension of about 16 inches, and a vertical dimension of about 16.25 inches.

The components forming the horizontal pipe section 23—namely, the pipe sections 26, 27 and the door guide 29—are preferably attached together utilizing bolts 38 or the like, having heads 39 and nuts 40 associated therewith. A plurality of openings are provided in a circular path around each of the flanges 36, 37. The openings per se are not visible in the drawings, but as is clear from FIG. 6 the bolts 38, with heads 39, pass therethrough. The circular path of the openings has an inside diameter slightly greater than the diameter of the door guide 29, as can be seen in FIG. 5, and by the dotted line representation of the door guide 29 periphery in FIG. 6. When the bolts 38 are tightened, the door guide 29 is sandwiched between the flanges 36, 37 and positively held in place.

The pipe section 26—which preferably is of metal—is welded along the line of attachment thereof to the elbow 22. In order to provide good structural support for the horizontal pipe section, it is preferred that one or more metal gussets 35 (seen in both FIGS. 5 and 6) be provided, which connect the pipe section 26 and the elbow 27 to the top 14 of the chips bin 10, the gussets 35 being welded to the components that they engage.

The shaft 32, comprising the pivot pin, passes through circular bores 42 formed in the door guide 29 (see FIG. 6) at opposite ends of the door opening 30 and mounts the door 31 by passing through the collar 43 formed at the top of the door 31. The door 31 preferably is of metal and has dimensions just slightly less than those of the opening 30. For example, door 31 may have a height (vertical dimension) of about 16 inches and a width of about 15.75 inches. In order to provide effective reinforcement, the door 31 may be provided as a plate which has three gussets 45 (see FIG. 6) disposed on each of the opposite faces thereof. The collar 43 has openings 44 spaced along the length thereof to allow plug welding of the pivot pin 32 to the collar 43 at the openings 44.

At the end of the pivot pin 32 extending outwardly from the door guide 29—the left side as viewed in FIG. 6—a flange 47 is provided, the flange being vertically disposed and having a plurality of openings (e.g. four) disposed around it. The flange 47 cooperates with a counterweight means 48 which provides an adjustable biasing force for biasing the door 31 to the vertical position illustrated in FIGS. 2 and 6. It is desirable that the door 31 itself not have too large a weight (e.g. only about twelve pounds), which is one reason for the plate with gusset construction as illustrated in FIG. 6. Rather, the necessary weight for the biasing of the door to its vertical orientation is provided by the counterweight mechanism 48.

As seen in FIGS. 5 and 6, the counterweight mechanism 48 preferably comprises a generally vertical rod section 49 having external screw threads 50 disposed over at least a portion of the length thereof, and a horizontal rod section 51, the sections 49, 51 being connected by the right angle bend 52. Welded to the horizontal rod section 51 is a generally vertical flange 53 which has elongated arcuate openings 54 therein which are alignable with the openings (not shown) in the flange 47 to receive fasteners 55 therein. Because of the arcuate construction of the openings 54, the angular position of the flange 53 with respect to the flange 47 may be adjusted before the fasteners 55 are tightened to hold the flanges 53, 47 tightly together in face-to-face relationship, so that they cannot move with respect to each other. For example, the interiors of the openings in the flange 47 may be screw threaded to receive external screw threads on the fasteners 55.

A plurality of weight discs 58 are provided for providing the weight adjustably mounted on the vertical rod section 49. The weight discs 58 have central openings, i.e., they are annular in shape, each central openings being larger than the outside diameter of the vertical rod section 49. The weights 58 are held on the vertical rod section 49 by nuts 59 at least at the bottom thereof, and preferably also by the nuts 60 at the top thereof. The nuts 59, 60 are screw threaded onto the external threading 50 on the vertical rod section 49 so that the annular weights 58 are held tightly in place.

The amount of weight provided by the discs 58 is adjusted by the number of discs 58 that are connected between the nuts 59, 60 to provide the desired biasing force. Typically the number of weights 58 will be chosen so that the door 31 will have a vertical orientation (FIGS. 2 and 6) if the pressure differential between the chips bin 10 interior and the environment is about 2 psig or less, but if the pressure on either face of the door 31 compared to the pressure on the opposite face is greater than about 2 psig, then the door will move away from the high pressure side to provide the necessary vacuum/pressure relief.

Figure 7:
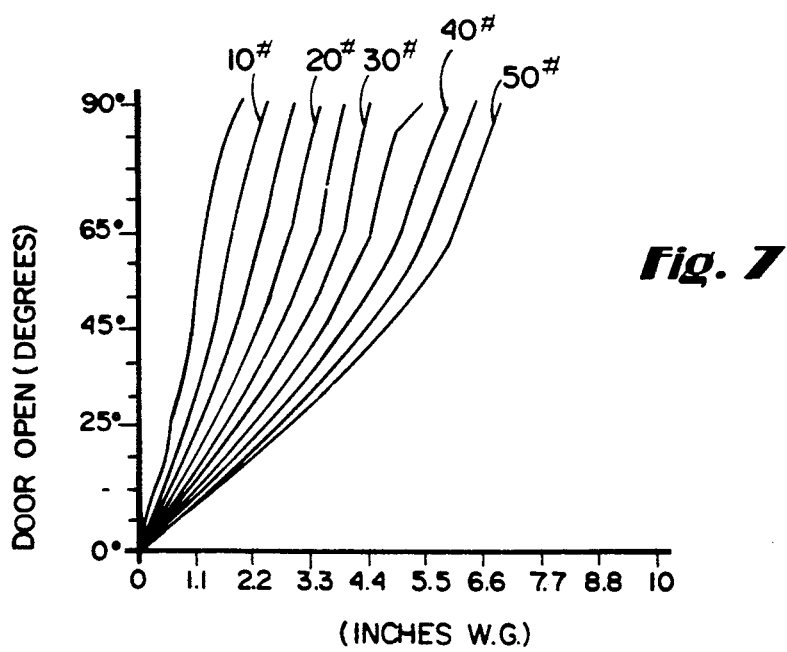
FIG. 7 is a rough graphical representation of the amount the door opens depending upon the differential pressure and the amount of weight of the counterweight.

The amount that the door 31 will open depends upon the pressure differential and the weight of the counterweight. FIG. 7 is a rough graphical representation showing the amount the door opens, in degrees, along the vertical axis, and the pressure differential (in inches W.G.) along the right axis, for five pound increments of counterweights from five pounds to fifty pounds.

Method

Utilizing the apparatus heretofore described, a method of maintaining proper pressure conditions within an atmospheric pre-steaming chips bin and the treatment of wood chips, or other comminuted cellulosic fibrous material, to make paper pulp is provided. That method comprises the steps of feeding wood chips or like material into the chips bin 10 through the inlet 11, and feeding steam in through the line 19, to effect steaming of the chips; discharging the steamed chips through the discharge 16 in the bottom 15 of the chips bin 10; precluding passage of gas through the horizontal pipe section 23 if the pressure differential between the interior of the chips bin 10 and the surrounding environment is less than a predetermined level (e.g. about 2 psig); and allowing passage of gases into, or out of, the chips bin 10 from or to the surrounding environment through the horizontal pipe section 23 if the predetermined pressure differential is greater than the predetermined level.

The last two steps, above, are practiced by providing a door guide 29 tightly clamped between the flanges 36, 37 to preclude gas from moving in the pipe section 23 except through the opening 30, and mounting the door 31 so that it hangs for pivotal movement about the pivot pin 32 at the top of the opening 30 to close off the opening 30 so that no significant amounts of gas can pass through the opening 30 (although there certainly will be leakage around the door 31, between it and the guide 29). The door 31 is adjustably biased to the vertical orientation illustrated in FIGS. 2 and 6 by the counterweight mechanism 48. The biasing force applied by the counterweight mechanism 48 is adjusted by removing nuts 59 and either adding or taking away one or more weight discs 58, and then screwing the nuts 59 back in place. The steamed wood chips that have been treated in the chips bin 10 ar ultimately discharged through the low pressure feeder 17 into the horizontal steaming vessel 18, and subsequently continuously digested or otherwise treated to produce paper pulp.

During the pre-steaming operation in the chips bin 10, should an excessive vacuum develop in the chips bin interior, the door 31 will pivot about the axis defined by the pivot pin 32 in the manner illustrated in FIG. 3, to allow atmospheric air to pass into the bin 10. Conversely, should an excess of pressure build up in the bin 10, the gases inside the bin will cause the door 31 to pivot about the pivot pin 32, as illustrated in FIG. 4, so that such gases are vented to the environment.

It will thus be seen that according to the present invention an effective yet simple apparatus has been provided for allowing the vacuum/pressure relief in the chips bin in the production of paper pulp from wood chips or the like. The invention also relates to a simple method for maintaining proper pressure conditions within an atmospheric pre-steaming chips bin in the treatment of material to make paper pulp. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A chips bin having a vent for allowing gases to enter or leave the chips bin if the differential pressure between the interior of the chips bin and the surrounding environment is greater than a predetermined level, said chips bin comprising:

a generally vertically oriented vessel having a top, and a bottom, with a first opening in the top for receipt of comminuted cellulosic fibrous material, and a second, vent, opening in the top;

a material discharge from the bottom of said chips bin;

a conduit extending from said second opening, and including a vertical section, an elbow section, and a horizontal section;

means defining a door guide in said horizontal section, having a door opening therein, said door guide precluding passage of gas therepast in said horizontal section except through said door opening;

means defining a pivot axis above said door opening;

a pivot pin; and a door having opposite faces, and mounted by said pivot pin in operative association with said means defining a pivot axis, so that said door normally is of general vertical orientation, closing said door opening in said door guide, but is pivotal in either direction with respect to said general vertical orientation about said axis in response to the pressure of gases on either face thereof which is greater than a predetermined amount than the pressure of gases on the opposite face thereof.

2. A chips bin as recited in claim 1 further comprising means for applying an adjustable bias to said door for maintaining said door in said general vertical orientation, closing off said door opening.

3. A chips bin as recited in claim 2 wherein said means for applying an adjustable bias comprises a counterweight means.

4. A chips bin as recited in claim 3 wherein said pivot pin has a first end, extending outwardly from one side of said horizontal section, having a flange thereon perpendicular to said pivot pin; and wherein said counterweight means comprises a rod having a vertical portion and a horizontal portion, said horizontal portion having a flange thereon perpendicular thereto, and parallel to said vertical portion; and further comprising means defining openings in said flanges for cooperation with each other to allow connection to said rod to said pivot pin.

5. A chips bin as recited in claim 4 wherein said counterweight means further comprise: means defining external screw threads on at least a section of said rod vertical portion; a plurality of discs, each having an opening therein large enough to receive said rod vertical portion therein; and a nut cooperating with the external threading on said rod to hold said discs thereon.

6. A chips bin as recited in claim 5 wherein said openings in said rod flange are elongated, arcuate, openings so that the angular position of said rod flange with respect to said pivot pin flange may be adjusted.

7. A chips bin as recited in claim 4 wherein said horizontal section is formed by a first pipe having a vertical flange on one end thereof, and connected to said elbow on the opposite end thereof, and a second pipe having a vertical flange on one end thereof; means defining alignable openings in said pipe vertical flanges, said openings being disposed along a circular path having a diameter slightly greater than an outside diameter of said door guide; and removable fastener means passing through said vertical flange openings for holding said first and second pipe vertical flanges in a predetermined position with respect to each other sandwiching said door guide therebetween.

8. A chips bin as recited in claim 4 further comprising gussets extending between said top of said chips bin and said elbow and horizontal section, for positively supporting said horizontal section on said top.

* * * * *